US 7,448,450 B2

(12) United States Patent
Luke et al.

(10) Patent No.: US 7,448,450 B2
(45) Date of Patent: Nov. 11, 2008

(54) DRILLING AND CEMENTING WITH FLUIDS CONTAINING ZEOLITE

(75) Inventors: Karen Luke, Duncan, OK (US); Russell M. Fitzgerald, Waurika, OK (US); Frank Zamora, San Antonio, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 196 days.

(21) Appl. No.: 11/270,307

(22) Filed: Nov. 9, 2005

(65) Prior Publication Data

US 2006/0108150 A1 May 25, 2006

Related U.S. Application Data

(63) Continuation-in-part of application No. 10/795,158, filed on Mar. 5, 2004, now Pat. No. 7,147,067, which is a continuation-in-part of application No. 10/738,199, filed on Dec. 17, 2003, now Pat. No. 7,150,321, which is a continuation-in-part of application No. 10/727,370, filed on Dec. 4, 2003, now Pat. No. 7,140,439.

(51) Int. Cl.
*E21B 33/138* (2006.01)
*E21B 21/00* (2006.01)
*C09K 8/16* (2006.01)
*C09K 8/467* (2006.01)

(52) U.S. Cl. .................. 166/293; 106/813; 106/819; 166/292; 166/300; 175/64; 175/65; 507/140

(58) Field of Classification Search ................ 166/285, 166/292, 293, 300; 175/64, 65, 72; 106/813, 106/819; 507/140
See application file for complete search history.

(56) References Cited

U.S. PATENT DOCUMENTS

| | | | |
|---|---|---|---|
| 1,943,584 A | 1/1934 | Cross | |
| 2,094,316 A | 9/1937 | Cross et al. | |
| 2,131,338 A | 9/1938 | Vail | |
| 2,349,049 A | 5/1944 | Means | |
| 2,581,186 A | 1/1952 | Green | |
| 2,662,827 A | 5/1953 | Clark | |
| 2,727,001 A | 12/1955 | Rowe | |
| 2,848,051 A | 8/1958 | Williams | |
| 3,047,493 A | 7/1962 | Rosenberg | |
| 3,065,170 A | 11/1962 | Dumbauld et al. | |
| 3,179,528 A | 4/1965 | Holmgreen et al. | |
| 3,293,040 A | 12/1966 | Shaler, Jr. et al. | |
| 3,359,225 A | 12/1967 | Weisend | |
| 3,374,057 A | 3/1968 | McDaniel et al. | |
| 3,406,124 A | 10/1968 | Eastwood et al. | |
| 3,640,905 A | 2/1972 | Wilson | |
| 3,647,717 A | 3/1972 | Bolton | |
| 3,676,330 A | 7/1972 | Plank et al. | |
| 3,694,152 A | 9/1972 | Sersale et al. | |
| 3,781,225 A | 12/1973 | Schwartz | |
| 3,884,302 A | 5/1975 | Messenger | |
| 3,887,385 A | 6/1975 | Quist et al. | |
| 3,888,998 A | 6/1975 | Sampson et al. | |
| 3,963,508 A | 6/1976 | Masaryk | |
| 4,031,959 A | 6/1977 | Henderson | |
| 4,054,462 A | 10/1977 | Stude | |
| 4,141,843 A | 2/1979 | Watson | |
| 4,199,607 A | 4/1980 | Sherman et al. | |
| 4,217,229 A | 8/1980 | Watson | |
| 4,280,560 A | 7/1981 | Sydansk | |
| 4,311,607 A | 1/1982 | Kaeser | |
| 4,363,736 A | 12/1982 | Block | |
| 4,368,134 A | 1/1983 | Kaeser | |
| 4,372,876 A | 2/1983 | Kulprathipanja et al. | |
| 4,435,216 A | 3/1984 | Diehl et al. | |
| 4,444,668 A | 4/1984 | Walker et al. | |
| 4,468,334 A | 8/1984 | Cox et al. | |
| 4,474,667 A | 10/1984 | Block | |
| 4,482,379 A | 11/1984 | Dibrell et al. | |
| 4,515,216 A | 5/1985 | Childs et al. | |
| 4,515,635 A | 5/1985 | Rao et al. | |
| 4,519,844 A | 5/1985 | Chaux et al. | |
| 4,530,402 A | 7/1985 | Smith et al. | |
| 4,536,297 A | 8/1985 | Loftin et al. | |
| 4,548,734 A | 10/1985 | Chaux et al. | |
| 4,548,735 A | 10/1985 | Bock et al. | |
| 4,552,591 A | 11/1985 | Millar | |
| 4,555,269 A | 11/1985 | Rao et al. | |
| 4,557,763 A | 12/1985 | George et al. | |
| 4,632,186 A | 12/1986 | Boncan et al. | |
| 4,650,593 A | 3/1987 | SIngerland | |
| 4,652,391 A | 3/1987 | Balk | |
| 4,676,317 A | 6/1987 | Fry et al. | |
| 4,703,801 A | 11/1987 | Fry et al. | |
| 4,717,488 A | 1/1988 | Seheult et al. | |
| 4,721,633 A | 1/1988 | Baldassin | |
| 4,772,307 A | 9/1988 | Kiss et al. | |
| 4,784,693 A | 11/1988 | Kirkland et al. | |

(Continued)

FOREIGN PATENT DOCUMENTS

CA 2153372 9/1996

(Continued)

OTHER PUBLICATIONS

Janotka, I., "The properties of Mortar Using Blends With Portland Cement Clinker, Zeolite Tuff and Gypsum", dated 1992.

(Continued)

*Primary Examiner*—George Suchfield
(74) *Attorney, Agent, or Firm*—Craig W. Roddy; Haynes & Boohe, LLP.

(57) ABSTRACT

Methods and compositions for cementing, especially drilling fluids that comprise zeolite and a carrier fluid, and cementing compositions made with such drilling fluids.

17 Claims, No Drawings

U.S. PATENT DOCUMENTS

| | | | |
|---|---|---|---|
| 4,802,921 A | 2/1989 | Motoki | |
| 4,818,288 A | 4/1989 | Aignesberger et al. | |
| 4,818,518 A | 4/1989 | Gioffre et al. | |
| 4,888,120 A * | 12/1989 | Mueller et al. | 507/227 |
| 4,943,544 A | 7/1990 | McGarry et al. | 501/124 |
| 4,986,989 A | 1/1991 | Sirosita et al. | |
| 5,121,795 A | 6/1992 | Ewert et al. | |
| 5,123,487 A | 6/1992 | Harris et al. | |
| 5,125,455 A | 6/1992 | Harris et al. | |
| 5,127,473 A | 7/1992 | Harris et al. | |
| 5,151,131 A | 9/1992 | Burkhalter et al. | |
| 5,238,064 A | 8/1993 | Dahl et al. | |
| 5,252,554 A | 10/1993 | Mueller et al. | |
| 5,301,752 A | 4/1994 | Cowan et al. | |
| 5,307,876 A | 5/1994 | Cowan et al. | |
| 5,314,022 A | 5/1994 | Cowan et al. | |
| 5,314,852 A | 5/1994 | Blatte | |
| 5,340,388 A | 8/1994 | Breton et al. | |
| 5,340,860 A | 8/1994 | Brake et al. | |
| 5,346,012 A | 9/1994 | Heathman et al. | |
| 5,383,967 A | 1/1995 | Chase | |
| 5,435,846 A | 7/1995 | Tatematsu et al. | |
| 5,464,060 A | 11/1995 | Hale et al. | |
| 5,494,513 A | 2/1996 | Ding et al. | |
| 5,501,276 A | 3/1996 | Weaver et al. | |
| 5,527,387 A | 6/1996 | Anderson et al. | 106/693 |
| 5,529,624 A | 6/1996 | Riegler | |
| 5,588,489 A | 12/1996 | Chatterji et al. | |
| 5,626,665 A | 5/1997 | Barger et al. | |
| 5,658,624 A | 8/1997 | Anderson et al. | 428/34.7 |
| 5,680,900 A | 10/1997 | Nguyen et al. | |
| 5,711,383 A | 1/1998 | Terry et al. | |
| 5,716,910 A | 2/1998 | Totten et al. | |
| 5,759,964 A | 6/1998 | Schuchart et al. | |
| 5,776,850 A | 7/1998 | Klatte et al. | |
| 5,788,762 A | 8/1998 | Barger et al. | |
| 5,789,352 A | 8/1998 | Carpenter et al. | |
| 5,807,810 A | 9/1998 | Blezard et al. | |
| 5,821,233 A | 10/1998 | Van Rijn et al. | |
| 5,851,960 A | 12/1998 | Totten et al. | |
| 5,866,517 A | 2/1999 | Carpenter et al. | |
| 5,880,048 A | 3/1999 | Sato et al. | |
| 5,883,070 A | 3/1999 | Urfer et al. | |
| 5,900,052 A | 5/1999 | Nakajima et al. | |
| 5,902,564 A | 5/1999 | Lujano et al. | |
| 5,913,364 A | 6/1999 | Sweatman | |
| 5,964,692 A | 10/1999 | Blezard et al. | |
| 5,980,446 A | 11/1999 | Loomis et al. | |
| 5,990,052 A | 11/1999 | Harris | |
| 5,997,625 A | 12/1999 | Londo et al. | |
| 6,060,434 A | 5/2000 | Sweatman et al. | |
| 6,063,738 A | 5/2000 | Chatterji et al. | |
| 6,070,664 A | 6/2000 | Dalrymple et al. | |
| 6,138,759 A | 10/2000 | Chatterji et al. | |
| 6,145,591 A | 11/2000 | Boncan et al. | |
| 6,149,724 A | 11/2000 | Ulibarri et al. | |
| 6,153,562 A | 11/2000 | Villar et al. | |
| 6,167,967 B1 | 1/2001 | Sweatman | |
| 6,170,575 B1 | 1/2001 | Reddy et al. | |
| 6,171,386 B1 | 1/2001 | Sabins | |
| 6,176,315 B1 | 1/2001 | Reddy et al. | |
| 6,182,758 B1 | 2/2001 | Vijn | |
| 6,209,646 B1 | 4/2001 | Reddy et al. | |
| 6,210,476 B1 | 4/2001 | Chatterji et al. | |
| 6,213,213 B1 | 4/2001 | van Batenburg et al. | |
| 6,230,804 B1 | 5/2001 | Mueller et al. | |
| 6,234,251 B1 | 5/2001 | Chatterji et al. | |
| 6,235,809 B1 | 5/2001 | Arias et al. | |
| 6,245,142 B1 | 6/2001 | Reddy et al. | |
| 6,258,757 B1 | 7/2001 | Sweatman et al. | |
| 6,283,213 B1 | 9/2001 | Chan | |
| 6,312,515 B1 | 11/2001 | Barlet-Gouedard et al. | |
| 6,315,042 B1 | 11/2001 | Griffith et al. | |
| 6,372,694 B1 | 4/2002 | Osinga et al. | |
| 6,379,456 B1 | 4/2002 | Heathman et al. | |
| 6,387,873 B1 | 5/2002 | Carter et al. | |
| 6,390,197 B1 | 5/2002 | Maroy | |
| 6,405,801 B1 | 6/2002 | Vijn et al. | |
| 6,409,819 B1 | 6/2002 | Ko | |
| 6,457,524 B1 | 10/2002 | Roddy | |
| 6,475,275 B1 | 11/2002 | Nebesnak et al. | |
| 6,478,869 B2 | 11/2002 | Reddy et al. | |
| 6,488,091 B1 | 12/2002 | Weaver et al. | |
| 6,494,951 B1 | 12/2002 | Reddy et al. | |
| 6,508,305 B1 | 1/2003 | Brannon et al. | |
| 6,508,306 B1 | 1/2003 | Reddy et al. | |
| 6,524,384 B2 | 2/2003 | Griffith et al. | |
| 6,555,505 B1 | 4/2003 | King et al. | |
| 6,565,647 B1 | 5/2003 | Day et al. | |
| 6,566,310 B2 | 5/2003 | Chan | |
| 6,572,698 B1 | 6/2003 | Ko | |
| 6,593,402 B2 | 7/2003 | Chatterji et al. | |
| 6,607,035 B1 | 8/2003 | Reddy et al. | |
| 6,610,139 B2 | 8/2003 | Reddy et al. | |
| 6,616,753 B2 | 9/2003 | Reddy et al. | |
| 6,626,243 B1 | 9/2003 | Boncan | |
| 6,626,991 B1 | 9/2003 | Drochon et al. | |
| 6,630,021 B2 | 10/2003 | Reddy et al. | |
| 6,645,289 B2 | 11/2003 | Sobolev et al. | |
| 6,656,265 B1 | 12/2003 | Garnier et al. | |
| 6,656,266 B1 | 12/2003 | Barlet-Gouedard et al. | |
| 6,660,080 B2 | 12/2003 | Reddy et al. | |
| 6,702,044 B2 | 3/2004 | Reddy et al. | |
| 6,711,213 B2 | 3/2004 | He et al. | |
| 6,713,553 B2 | 3/2004 | Gonnon et al. | |
| 6,719,055 B2 | 4/2004 | Mese et al. | |
| 6,722,434 B2 | 4/2004 | Reddy et al. | |
| 6,729,405 B2 | 5/2004 | DiLullo et al. | |
| 6,737,385 B2 | 5/2004 | Todd et al. | |
| 6,743,288 B2 | 6/2004 | Eoff et al. | |
| 6,752,866 B2 | 6/2004 | Gonnon et al. | |
| 6,767,868 B2 | 7/2004 | Dawson et al. | |
| 6,786,966 B1 | 9/2004 | Johnson et al. | |
| 6,793,018 B2 | 9/2004 | Dawson et al. | |
| 6,793,730 B2 | 9/2004 | Reddy et al. | |
| 6,796,378 B2 | 9/2004 | Reddy et al. | |
| 6,822,061 B2 | 11/2004 | Eoff et al. | |
| 6,823,940 B2 | 11/2004 | Reddy et al. | |
| 6,832,651 B2 | 12/2004 | Ravi et al. | |
| 6,832,652 B1 | 12/2004 | Dillenbeck et al. | |
| 6,837,316 B2 | 1/2005 | Reddy et al. | |
| 6,840,319 B1 | 1/2005 | Chatterji et al. | |
| 6,840,996 B2 | 1/2005 | Morioka et al. | |
| 6,843,841 B2 | 1/2005 | Reddy et al. | |
| 6,881,708 B2 | 4/2005 | Reddy et al. | |
| 6,883,609 B2 | 4/2005 | Drochon et al. | |
| 6,887,828 B2 | 5/2005 | Allen et al. | |
| 6,889,767 B2 | 5/2005 | Reddy et al. | |
| 6,907,929 B2 | 6/2005 | Leroy-Delage et al. | |
| 6,953,091 B2 | 10/2005 | Volpert | |
| 6,959,773 B2 | 11/2005 | Mese et al. | |
| 6,960,624 B2 | 11/2005 | Gonnon et al. | |
| 6,964,302 B2 | 11/2005 | Luke et al. | |
| 6,989,057 B2 | 1/2006 | Getzlaf et al. | |
| 7,021,380 B2 | 4/2006 | Caveny et al. | |
| 7,048,053 B2 | 5/2006 | Santra et al. | |
| 7,073,585 B2 | 7/2006 | Morgan et al. | |
| 7,137,448 B2 | 11/2006 | Arias et al. | 466/292 |
| 7,140,439 B2 | 11/2006 | Luke et al. | |
| 7,140,440 B2 | 11/2006 | Luke et al. | |
| 7,147,067 B2 | 12/2006 | Getzlaf et al. | |
| 7,150,321 B2 | 12/2006 | Luke et al. | |
| 7,182,137 B2 | 2/2007 | Fyten et al. | |
| 7,228,905 B2 | 6/2007 | Santra et al. | |

| | | | |
|---|---|---|---|
| 7,285,164 B2 | 10/2007 | Luke et al. | |
| 7,285,166 B2 | 10/2007 | Luke et al. | |
| 7,296,626 B2 | 11/2007 | Luke et al. | |
| 7,297,664 B2 | 11/2007 | Santra et al. | |
| 7,303,015 B2 | 12/2007 | Fyten et al. | |
| 7,309,558 B1 | 12/2007 | Michel et al. | |
| 7,316,744 B2 | 1/2008 | De La Roij | |
| 7,326,291 B2 | 2/2008 | Fyten et al. | |
| 7,332,026 B2 | 2/2008 | Fyten et al. | |
| 7,338,925 B2 | 3/2008 | Santra et al. | |
| 2001/0014651 A1 | 8/2001 | Reddy et al. | |
| 2002/0077390 A1 | 6/2002 | Gonnon et al. | |
| 2002/0091177 A1 | 7/2002 | Gonnon et al. | |
| 2002/0117090 A1 | 8/2002 | Kusnetsova et al. | |
| 2002/0157575 A1 | 10/2002 | DiLullo et al. | |
| 2003/0066460 A1 | 4/2003 | Reddy et al. | |
| 2003/0092582 A1 | 5/2003 | Reddy et al. | |
| 2003/0096945 A1 | 5/2003 | Eoff et al. | |
| 2003/0153466 A1 | 8/2003 | Allen et al. | |
| 2003/0168215 A1 | 9/2003 | Drochon et al. | |
| 2003/0181543 A1 | 9/2003 | Reddy et al. | |
| 2003/0203996 A1 | 10/2003 | Gonnon et al. | |
| 2003/0217847 A1 | 11/2003 | Reddy et al. | |
| 2004/0007162 A1 | 1/2004 | Morioka et al. | |
| 2004/0007360 A1 | 1/2004 | Leroy-Delage et al. | |
| 2004/0035331 A1 | 2/2004 | Volpert | |
| 2004/0040475 A1 | 3/2004 | Roij | |
| 2004/0040712 A1 | 3/2004 | Ravi et al. | |
| 2004/0069537 A1 | 4/2004 | Reddy et al. | |
| 2004/0069538 A1 | 4/2004 | Reddy et al. | |
| 2004/0083926 A1 | 5/2004 | Mitkova et al. | |
| 2004/0094331 A1 | 5/2004 | Mese et al. | |
| 2004/0107877 A1 | 6/2004 | Getzlaf et al. | |
| 2004/0108113 A1 | 6/2004 | Luke et al. | |
| 2004/0112255 A1 | 6/2004 | Bruno et al. | |
| 2004/0112600 A1 | 6/2004 | Luke et al. | |
| 2004/0168803 A1 | 9/2004 | Reddy et al. | |
| 2004/0187740 A1 | 9/2004 | Timmons | |
| 2004/0188091 A1 | 9/2004 | Luke et al. | |
| 2004/0188092 A1 | 9/2004 | Santra et al. | |
| 2004/0244977 A1 | 12/2004 | Luke et al. | |
| 2004/0262000 A1 | 12/2004 | Morgan et al. | |
| 2004/0262001 A1 | 12/2004 | Caveny et al. | |
| 2005/0000734 A1 | 1/2005 | Getzlaf et al. | |
| 2005/0034864 A1 | 2/2005 | Caveny et al. | |
| 2005/0121194 A1 | 6/2005 | Morgan et al. | |
| 2005/0124503 A1 | 6/2005 | Morgan et al. | |
| 2005/0133222 A1 | 6/2005 | Arias et al. | |
| 2005/0204962 A1 | 9/2005 | Luke et al. | |
| 2006/0025312 A1 | 2/2006 | Santra et al. | |
| 2006/0148657 A1 | 7/2006 | Santra et al. | |
| 2006/0258547 A1 | 11/2006 | Luke et al. | |
| 2007/0028811 A1 | 2/2007 | Luke et al. | |
| 2007/0032388 A1 | 2/2007 | Getzlaf et al. | |
| 2007/0051279 A1 | 3/2007 | Fyten et al. | |
| 2007/0051280 A1 | 3/2007 | Fyten et al. | |
| 2007/0051515 A1 | 3/2007 | Fyten et al. | |
| 2007/0101906 A1 | 5/2007 | Luke et al. | |
| 2008/0066652 A1 | 3/2008 | Fraser et al. | |

FOREIGN PATENT DOCUMENTS

| | | |
|---|---|---|
| EP | 802 253 A1 | 10/1997 |
| EP | 0 895 971 A1 | 2/1999 |
| EP | 0 621 247 B1 | 7/1999 |
| EP | 1 260 491 A1 | 11/2002 |
| EP | 1 428 805 A1 | 6/2004 |
| FR | 763.998 | 5/1937 |
| GB | 1469954 | 4/1977 |
| GB | 2 353 523 A | 2/2001 |
| JP | 52117316 | 10/1977 |
| JP | 61021947 A | 1/1986 |
| JP | 07003254 | 6/1995 |
| JP | 10110487 | 4/1998 |
| SU | 1373781 | 2/1988 |
| WO | WO 97/28097 | 8/1997 |
| WO | WO 98/54108 | 12/1998 |
| WO | WO 00/50357 | 8/2000 |
| WO | WO 01/70646 A1 | 9/2001 |
| WO | WO 2005/059301 A1 | 6/2005 |

OTHER PUBLICATIONS

Luke, Karen et al., "Liquid Additive for Reducing Water-Soluble Chromate," filed Nov. 8, 2005 as U.S Appl. No. 11/269,350.
Office Action from a related counterpart application U.S. Appl. No. 11/126,626 dated Dec. 7, 2005.
Office action from a related counterpart application U.S. Appl. No. 10/795,158 dated Dec. 6, 2005.
Office Action dated Dec. 27, 2005 from a related counterpart U.S. Appl. No. 10/816,034, filed Apr. 1, 2004.
Foreign communication from a related counterpart application dated Nov. 4, 2005.
Office action from a related counterpart application, U.S. Appl. No. 10/623,443 dated Mar. 3, 2006.
Office Action from a related counterpart application, U.S. Appl. No. 11/126,626 dated Jun. 23, 2006.
Luke, K. et al., "Zeolite-Containing Remedial Compositions" filed Jul. 17, 2006 as U.S. Appl. No. 11/488,388.
Office action from U.S. Appl. No. 10/623,443 dated Jul. 27, 2006.
Office Action from a related counterpart application, U.S. Appl. No. 11/338,485 dated Aug. 11, 2006.
Luke, Karen et al., "Fluid Loss Additives For Cement Slurries," filed Oct. 10, 2006 as U.S. Appl. No. 11/545,392.
Luke, Karen et al., "Zeolite-Containing Drilling Fluids" filed Oct. 9, 2006 as U.S. Appl. No. 11/544,691.
Fyten, Glen et al., "Cementitious Compositions Containing Interground Cement Clinker and Zeolite" filed Nov. 8, 2006 as U.S. Appl. No. 11/594,435.
Fyten, Glen et al., "Cementitious Compositions Containing Interground Cement Clinker and Zeolite" filed Nov. 8, 2006 as U.S. Appl. No. 11/594,326.
Fyten, Glen et al., "Cementitious Compositions Containing Interground Cement Clinker and Zeolite" filed Nov. 8, 2006 as U.S. Appl. No. 11/594,430.
Communication issued Mar. 25, 2004, by the European Patent Office in connection with Application No. 03252598.2.
Communication issued Aug. 23, 2004, by the European Patent Office in connection with Application No. 03252598.2.
International Search Report and Written Opinion issued Nov. 25, 2004, by the European International Searching Authority, in connection with International Application No. PCT/GB2004/003094.
International Search Report and Written Opinion issued Jul. 28, 2005, by the European International Searching Authority, in connection with International Application No. PCT/GB2005/001256.
Office Action dated Dec. 4, 2003, issued in connection with U.S. Appl. No. 10/315,415.
Office Action dated Jun. 25, 2004, issued in connection with U.S. Appl. No. 10/315,415.
Office Action dated Sep. 10, 2004, issued in connection with U.S. Appl. No. 10/315,415.
Office Action dated Nov. 9, 2004, issued in connection with U.S. Appl. No. 10/315,415.
Office Action dated May 12, 2005, issued in connection with U.S. Appl. No. 10/315,415.
Office Action dated Sep. 7, 2005, issued in connection with U.S. Appl. No. 10/623,443.
Office Action dated May 25, 2007, issued in connection with U.S. Appl. No. 10/623,443.
Office Action dated Nov. 18, 2004, issued in connection with U.S. Appl. No. 10/686,098.
Office Action dated Nov. 4, 2005, issued in connection with U.S. Appl. No. 10/727,370.
Office Action dated Nov. 7, 2005, issued in connection with U.S. Appl. No. 10/738,199.

Office Action dated Jan. 22, 2007, issued in connection with U.S. Appl. No. 11/338,576.
Office Action dated Jun. 21, 2007, issued in connection with U.S. Appl. No. 11/338,576.
Halliburton/Baroid brochure entitled EZ MUL Emulsifier, 2002.
Halliburton/Baroid brochure entitled EZ MUL NTE Emulsifier, 2002.
Halliburton/Baroid brochure entitled Geltone II Viscosifier, 2002.
Halliburton/Baroid brochure entitled Geltone V Viscosifier, 2002.
Halliburton/Baroid brochure entitled Duratone HT, Filtration Control Agent, 2002.
Halliburton/Baroid brochure entitled Barazan Plus, 2002.
Halliburton/Baroid brochure entitled EZ-Mud Shale Stabilizer, 2002.
Halliburton/Baroid brochure entitled Invermul Emulsifier, 2002.
Baroid brochure entitled "Aquagel Gold Seal®" dated 2002.
Baroid Fluid Services brochure entitled "Barazan® Viscosifier/Suspension Agent" dated 2005.
Halliburton brochure entitled "CFR-2 Cement Friction Reducer" dated 1999.
Halliburton brochure entitled "CFR-3 Cement Friction Reducer" dated 1998.
Halliburton brochure entitled "D-Air 2 Anti-Foam Agent" dated 1999.
Baroid Fluid Services brochure entitled "Duratone® HT Filtration Control Agent" dated 2005.
Baroid Fluid Services brochure entitled "EZ-Mud® Shale Stabilizer" dated 2005.
Baroid Fluid Services brochure entitled "EZ MUL® Emulsifier" dated 2005.
Baroid Fluid Services brochure entitled "EZ MUL® NTE Emulsifier" dated 2005.
Baroid Fluid Services brochure entitled "Geltone® II Viscosifier" dated 2005.
Baroid Fluid Services brochure entitled "Geltone® V Viscosifier" dated 2005.
Halliburton brochure entitled "Halad®-344 Fluid-Loss Additive" dated 1998.
Halliburton brochure entitled "Halad®-413 Fluid-Loss Additive" dated 1999.
Halliburton brochure entitled "HR®-5 Cement Additive" dated 1998.
Halliburton brochure entitled "HR®-7 Cement Retarder" dated 1999.
Baroid Fluid Services brochure entitled "Invermul® Emulsifier" dated 2005.
Halliburton brochure entitled "Microsand Cement Additive" dated 1999.
Halliburton brochure entitled "SSA-1Strength-Stabilizing Agent" dated 1998.
Halliburton brochure entitled "SSA-2 Coarse Silica Flour" dated 1999.
"Hydraulic engineering cement", International Center for Materials Technology Promotion, 2003.
"Portland Cement, Concrete, and Heat of Hydration", Portland Cement Association, Concrete Technology Today, vol. 18, No. 2, 1997.
Powder Diffraction File, International Centre for Diffraction Data, 2002.
Underdown, D.R. et al., "Acidization of Analcime-Cemented Sandstone, Gulf of Mexico", SPE 20624, dated 1990.
Rogers, B.A. et al., "Designing a Remedial Acid Treatment for Gulf of Mexico Deepwater Turbidite Sands Containing Zeolite Cement," SPE 39595, dated 1998.
Bruhn, R.L. et al., "Tectonics, fluid migration, and fluid pressure in a deformed forearc basin, Cook Inlet, Alaska," dated 2000.
Komarneni, S. et al., "Alteration of Clay Minerals and Zeolites in Hydrothermaly Brines" dated 1983.
Bartlet-Gouedard, V. et al., "A Non-Conventional Way of Developing Cement Slurry for Geothermal Wells," pp. 85-91.
Poon, C.S. et al., "A study on the hydratino rate of natural zeolite blended cement pastes" dated 1999.
Feng, N-Q et al., "Zeolite ceramsite cellular concrete" pp. 117-112, dated 2000.
Bagosi, S. et al., "Immobilization of caesium-loaded ion exchange resins in zeolite-cement blends" pp. 479-485,d ated 1999.
"Effect of Bentonite and Zeolite on Durability of Cement Suspension under Sulfate Attack," ACI Materials Journal, pp. 710-715, dated 1998.
Su, N. et al., "Reuse of waste catalysts from petrochemical industries for cement substitution," pp. 1773-1783, dated 2000.
Ding, Jian-Tong et al., "Extreme vertices design of concrete with combined mineral admixtures," dated 1999.
Naiqian, F. et al., "Study on the suppression effect of natural zeolite on expansion of concrete due to alkali-aggregate reaction," pp. 17-24, dated 1998.
Poon, C.S. et al., "A study on the hydration rate of natural zeolite blended cement pastes," pp. 427-432, dated 1999.
Notice of Allowance issued Dec. 14, 2007, by the U.S. Patent and Trademark Office in connection with U.S. Appl. No. 11/338,576.
Advisory Action mailed Aug. 11, 2008, by the U.S. Patent and Trademark Office in connection with U.S. Appl. No. 11/544,691.
Office Action mailed Aug. 21, 2008, by the U.S. Patent and Trademark Office in connection with U.S. Appl. No. 10/623,443.
Office Action issued Apr. 10, 2008, by the U.S. Patent and Trademark Office in connection with U.S. Appl. No. 10/623,443.
Office Action issued Apr. 16, 2008, by the U.S. Patent and Trademark Office in connection with U.S. Appl. No. 11/488,388.
Derwent Abstract of WO 2000/42147 entitled "Detergent Composition Useful in Cleaning Fabric, Dishware and or Hard Surfaces . . . "; Bettiol et al. as inventors, Jul. 20, 2000.
Office Action mailed May 27, 2008, by the U.S. Patent and Trademark Office in connection with U.S. Appl. No. 11/544,691.
Advisory Action mailed Jun. 17, 2008, by the U.S. Patent and Trademark Office in connection with U.S. Appl. No. 10/623,443
Office Action issued Nov. 24, 2006, by the United States Patent and Trademark Office in connection with U.S. Appl. No. 11/126,626.
Office Action issued Oct. 9, 2007, by the United States Patent and Trademark Office in connection with U.S. Appl. No. 10/623,443.
Office Action issued Oct. 9, 2007, by the United States Patent and Tradmark Office in connection with U.S. Appl. No. 11/488,388.
Office Action issued Oct. 30, 2007, by the United States Patent and Trademark Office in connection with U.S. Appl. No. 11/544,691.

* cited by examiner

DRILLING AND CEMENTING WITH FLUIDS CONTAINING ZEOLITE

CROSS-REFERENCE TO RELATED APPLICATIONS

This application is a continuation-in-part of U.S. application Ser. No. 10/795,158 filed Mar. 5, 2004, (now U.S. Pat. No. 7,147,067, issued Dec. 12, 2006), the entire disclosure of which is incorporated herein by reference, which is a continuation-in-part of U.S. application Ser. No. 10/738,199 filed Dec. 17, 2003, (now U.S. Pat. No. 7,150,321, issued Dec. 19, 2006), the entire disclosure of which is incorporated herein by reference, which is a continuation-in-part of U.S. application Ser. No. 10/727,370 filed Dec. 4, 2003, (now U.S. Pat. No. 7,140,439, issued Nov. 28, 2006), the entire disclosure of which is incorporated herein by reference. Applicant is hereby claiming the benefit of each of the above-identified applications.

BACKGROUND

The present embodiments relate generally to methods and compositions for cementing. In certain embodiments, methods and compositions for cementing in a subterranean zone penetrated by a wellbore are described.

Conventionally, a wellbore is drilled into a subterranean zone using a drilling fluid that is continuously re-circulated downwardly through the interior of a drill pipe and upwardly through the annulus between the exterior of the drill pipe and the walls of the wellbore. After a wellbore has been drilled to total depth, the circulation of the drilling fluid is stopped (called a "shut-down period"), the well is logged and casing is run in the wellbore.

After casing is placed in the wellbore, drilling fluid is again continuously re-circulated downwardly through the interior of the drill pipe and upwardly through the annulus between the exterior of the pipe and the walls of the wellbore, to remove drilling solids, filter cake, dehydrated drilling fluid, gelled drilling fluid, cuttings, and other debris.

However, the polymeric viscosifiers and additives typically used in drilling fluids create a filter cake that is generally very stable and difficult to remove. In addition, additives typically used in conventional drilling fluids, primarily bentonite, cause the drilling fluid to be incompatible with cementing compositions, such that if a cementing composition comes into contact with an appreciable amount of a conventional drilling fluid, the cementing composition will gel and become unpumpable.

Thus, removal of filter cake from the walls of the wellbore, and displacement of the drilling fluid from the wellbore, must take place prior to cementing the casing in the wellbore. If an appreciable amount of drilling fluid and/or filter cake remain in the annulus or on the walls of the wellbore, a cementing composition pumped into the wellbore can gel and become unpumpable, and/or the cementing composition will not properly bond to the walls of the wellbore and the casing. To remove drilling fluid and filter cake from the wellbore, it is known to run flushes, spacer fluids, and fluids at high turbulence, through the annulus between the casing and the walls of the wellbore prior to cementing.

With the wellbore cleared of drilling fluid and/or filter cake and/or other debris, the casing is cemented in the wellbore by placing a cementing composition in the annulus between the casing and the walls of the wellbore. The cementing composition is prepared by mixing dry cementitious material with a mixing fluid, and pumping the cementing composition down the interior of the casing and upwardly through the annulus between the exterior of the casing and the walls of the wellbore. The cementing composition sets into a hard impermeable mass, and is intended to bond the casing to the walls of the wellbore whereby the annulus is sealed and fluid communication between subterranean zones or to the surface by way of the annulus is prevented.

DESCRIPTION

According to certain embodiments described herein, methods and compositions for cementing are described.

According to certain embodiments, a method of performing cementing operations in a wellbore is described that includes drilling a wellbore extending from the surface of the earth into a subterranean formation, and continuously circulating a drilling fluid comprising zeolite and a carrier fluid in the wellbore during the drilling of the wellbore. Such method further includes mixing a cementitious material with an amount of the drilling fluid to form a cementing composition, introducing the cementing composition into the wellbore, and allowing the cementing composition to set therein.

According to certain embodiments, the mixing of the cementitious material with the zeolite-containing drilling fluid occurs upon the happening of a predefined condition, such as, the wellbore has been formed to a desired depth, or a predefined amount of drilling fluid has been circulated out of the wellbore and is available at the surface for mixing with the cementitious material.

The present embodiments provide methods and compositions that reduce or eliminate the need to remove drilling fluid and/or filter cake from the wellbore prior to performing cementing operations because, unlike conventional drilling fluids, the drilling fluids of the present embodiments are compatible with cementing compositions. In particular, drilling fluids comprising zeolite as described herein do not gel when contacted with cementitious material, and therefore contact with the drilling fluids described herein will not cause a cementing composition to become unpumpable. Thus, cementing operations can be commenced directly after the completion of drilling operations, without the need for intermediate operations to remove filter cake or drilling fluid from the wellbore.

Moreover, the present methods and compositions reduce or eliminate the need to dispose of used or re-circulated drilling fluid because the drilling fluid used to form the wellbore is mixed with cementitious material to form a cementing composition that is used in subsequent cementing operations.

According to the present embodiments described herein, a drilling fluid comprises zeolite and a carrier fluid. According to certain embodiments, the drilling fluid comprises zeolite in an amount from about 1% to about 25% by volume, or from about 5% to about 20% by volume, or from about 8% to about 15% by volume.

Zeolites are porous alumino-silicate minerals that may be either a natural or manmade material. Manmade zeolites are based on the same type of structural cell as natural zeolites and are composed of aluminosilicate hydrates having the same basic formula as given below. It is understood that as used in this application, the term "zeolite" means and encompasses all natural and manmade forms of zeolites. All zeolites are composed of a three-dimensional framework of $SiO_4$ and $AlO_4$ in a tetrahedron, which creates a very high surface area. Cations and water molecules are entrained into the framework. Thus, all zeolites may be represented by the crystallographic unit cell formula:

$$M_{a/n}[(AlO_2)_a(SiO_2)_b] \cdot xH_2O$$

where M represents one or more cations such as Na, K, Mg, Ca, Sr, Li or Ba for natural zeolites and $NH_4$, $CH_3NH_3$, $(CH_3)_3NH$, $(CH_3)_4N$, Ga, Ge and P for manmade zeolites; n represents the cation valence; the ratio of b:a is in a range from greater than or equal to 1 and less than or equal to 5; and x represents the moles of water entrained into the zeolite framework.

Zeolites suitable for use in a drilling fluid according to the present embodiments include analcime (hydrated sodium aluminum silicate), bikitaite (lithium aluminum silicate), brewsterite (hydrated strontium barium calcium aluminum silicate), chabazite (hydrated calcium aluminum silicate), clinoptilolite (hydrated sodium aluminum silicate), faujasite (hydrated sodium potassium calcium magnesium aluminum silicate), harmotome (hydrated barium aluminum silicate), heulandite (hydrated sodium calcium aluminum silicate), laumontite (hydrated calcium aluminum silicate), mesolite (hydrated sodium calcium aluminum silicate), natrolite (hydrated sodium aluminum silicate), paulingite (hydrated potassium sodium calcium barium aluminum silicate), phillipsite (hydrated potassium sodium calcium aluminum silicate), scolecite (hydrated calcium aluminum silicate), stellerite (hydrated calcium aluminum silicate), and stilbite (hydrated sodium calcium aluminum silicate). According to certain embodiments, the zeolite is one of chabazite and clinoptilolite.

According to certain embodiments, the drilling fluid includes from about 3% to about 98% by volume of a carrier fluid. According to other embodiments, the drilling fluid includes from about 50% to about 92% by volume of a carrier fluid. According to still other embodiments, the drilling fluid includes from about 80% to about 90% by volume of a carrier fluid.

Suitable carrier fluids include aqueous fluids, such as water and water-based gels, emulsions, acids, or mixtures thereof. The selection of a carrier fluid can be made by those of ordinary skill in the art, either based on known principles such as temperature stability and viscosity, or through routine experimentation. When the carrier fluid is water, the water can be fresh water, an unsaturated salt solution, including brines and seawater, or a saturated salt solution.

A variety of additives known to those of ordinary skill in the art may be included in the drilling fluids described herein. Such additives include weighting agents, dispersing agents, fluid loss control agents, (which are often referred to by those of ordinary skill in the art as "filtrate control agents" when referenced in connection with a fluid, and "fluid loss control agents" when referenced in connection with a cement composition), loss circulation material, surfactants (such as an emulsifier or a foaming agent), defoamers, and compatible viscosifying agents.

For example, according to some embodiments, fluid loss control additives comprising anionic or non-ionic water based soluble polymers are included in the zeolite-containing drilling fluid to provide effective fluid loss control. According to these embodiments, the anionic or non-ionic water based soluble polymers may or may not be hydrophobically modified.

According to certain embodiments, a fluid loss control additive is included in the zeolite-containing drilling fluid in an amount of from about 0.01% to about 2.5% by volume.

According to another embodiment, the drilling fluid includes a fluid loss control additive in an amount of from about 0.1% to about 1.0% by volume.

According to still other embodiments, a compatible viscosifier is included in the zeolite-containing drilling fluid. A compatible viscosifer is a viscosifer that will not cause gelling or other Theological problems with the drilling fluid when the drilling fluid is mixed with cementitious material. For example, bentonite would not be a compatible viscosifer to include in a zeolite-containing drilling fluid that will be mixed with cementitious material. Other clays, guar gum, and starches are also not likely to be compatible viscosifiers. Suitable compatible viscosifiers include, but are not limited to, natural or synthetic polymers, including modified cellulose and derivatives thereof. The choice of a compatible viscosifier depends upon the viscosity desired, chemical comparability with other fluids used in formation of the wellbore, and other wellbore design concerns. In one embodiment, the drilling fluid comprises zeolite, a carrier fluid, and up to about 5% by volume of a compatible viscosifier. In another embodiment, the drilling fluid includes from about 0.5% to about 2.5% by volume of a compatible viscosifier.

In yet other embodiments, a dispersant is included in the zeolite-containing drilling fluid. Suitable dispersants include those selected from the group consisting of sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers. According to one such embodiment, a drilling fluid comprises zeolite, a carrier fluid, and from about 0.01% to about 2.5% by volume of a dispersant. According to another such embodiment, the drilling fluid includes from about 0.1% to about 1.0% by volume of a dispersant.

According to still other embodiments, a weighting agent is included in the zeolite-containing drilling fluid. Suitable weighting agents include those selected from the group consisting of barium sulfate, also known as "barite", hematite, manganese tetraoxide, galena, ilmenite and calcium carbonate. According to one such embodiment, a drilling fluid includes zeolite, a carrier fluid, and up to about 20% by volume of a weighting agent. According to another such embodiment, the drilling fluid includes from about 2% to about 10% by volume of a weighting agent.

According to other embodiments described herein, zeolite-containing drilling fluids are mixed with cementitious material to form cementing compositions. A variety of cementitious materials can be used with the present embodiments, including but not limited to hydraulic cements. Hydraulic cements set and harden by reaction with water, and are typically comprised of calcium, aluminum, silicon, oxygen, and/or sulfur. Hydraulic cements include Portland cements, pozzolan cements, gypsum cements, aluminous cements, silica cements, and alkaline cements. According to certain embodiments, the cementitious material comprises at least one API Portland cement. As used herein, the term API Portland cement means any cements of the type defined and described in API Specification 10A, $23^{rd}$ Edition, Oct. 1, 2002, of the American Petroleum Institute, such as Classes A, B, C, G, and H, and the ISO equivalent of said API specification, namely ISO 10426-1-2001. In certain embodiments, cementing compositions are prepared with a zeolite-containing drilling fluid and cementitious material in an amount of at least 20% of the total weight of the cementing composition.

A variety of additives known to those of ordinary skill in the art may be included in the cementing compositions described herein. Such additives include density modifying materials (e.g., sodium silicate, microfine sand, iron oxides and manganese oxides), dispersing agents, set retarding agents, set accelerating agents, fluid loss control agents, strength retrogression control agents, loss circulation material, surfactants (such as an emulsifier or a foaming agent), defoamers, and compatible viscosifying agents.

For example, according to some embodiments, conventional set accelerating additives such as sodium chloride, sodium sulfate, sodium aluminate, sodium carbonate, calcium chloride, calcium sulfate, calcium carbonate, aluminum sulfate, potassium aluminum sulfate, sodium aluminum sulfate, potassium sulfate, and potassium carbonate, any of which can be used alone or in combination with other accelerating additives, are dry-mixed with cementitious material to increase early compressive strength development when the cementitious material dry-mix is mixed with a drilling fluid comprising zeolite.

According to other embodiments, dispersants, fluid loss control additives and compatible viscosifiers, such as those described above, are mixed with cementitious material and a drilling fluid comprising zeolite.

According to still other embodiments, drilling fluids comprising zeolite as described herein can improve the outcome of cementing operations because the zeolite can be made to set.

Various activators or combinations of activators can be used to cause the zeolite to set. Suitable activators include sources of calcium ions, sodium ions or potassium ions. In some embodiments, sources of magnesium ions could be suitable. When the activator is combined with a drilling fluid containing zeolite, the ions provided by the activator create alkaline conditions in the fluid suitable for setting of the zeolite.

In certain embodiments described herein, a cementing composition is prepared by mixing cementitious material with a drilling fluid comprising zeolite, wherein the cementitious material provides at least one of calcium ions, sodium ions or potassium ions to the cementing composition, and therefore acts as an activator with respect to the zeolite. According to some such embodiments, other activators, such as calcium hydroxide, calcium oxide, calcium nitrate, sodium silicate, sodium fluoride, sodium silicofluoride, sodium carbonate, potassium carbonate, sodium hydroxide, potassium hydroxide, sodium sulfate and mixtures thereof, can be included in the cementing composition to increase early compressive strength development of the zeolite.

The following examples are illustrative of the methods and compositions discussed above.

EXAMPLE 1

Four water-based drilling fluids ("Fluids 1-4") were prepared by combining the components as set forth in Table 1A below. The components listed in Table 1A were added one at a time to the carrier fluid (water) in a Waring blender at an rpm where the vortex was evident, usually between 2000-4000 rpm, in intervals of 15 seconds. After all the components had been added to the carrier fluid, the fluid was then blended for 2 minutes at 2000-4000 rpm.

Bentonite, barite (also known as barium sulfate), caustic soda and lime (also referred to as calcium hydroxide), as well as sources of same, are widely commercially available chemicals that are well known to those of ordinary skill in the art.

CFR-3 is the tradename for a dispersant comprising the condensation product of formaldehyde, acetone and a sulfite, and is commercially available from Halliburton Energy Services.

Biozan is the tradename for a clarified xanthan gum commercially available from GEO Drilling Fluids, Inc., and was used in this example to provide fluid loss control. Biozan contributed some suspension properties to the fluids in which it was used, however, the relative amounts of Biozan to the primary viscosifier (bentonite in Fluids 1 and 3, zeolite in Fluids 2 and 4) is such that the viscosifying effect of the Biozan is secondary to the viscosifying effect of the primary viscosifier.

CARBONOX is the tradename for a lignite material that is commercially available from Baroid Drilling Fluids, and is used in this example as a fluid loss control additive.

FWCA is the tradename for a free water control additive comprising cellulose that is commercially available from Halliburton Energy Services, and was used in this example to provide fluid loss control. FWCA contributed some suspension properties to the fluids in which it was used. However, the relative amounts of FWCA to the primary viscosifier (zeolite in Fluid 2) is such that the viscosifying effect of the FWCA is secondary to the viscosifying effect of the primary viscosifier.

Chabazite, which is commercially available from C2C Zeolite Corporation of Calgary, Canada was the zeolite in Fluids 2 and 4, and was used as the primary viscosifer for Fluids 2 and 4. Bentonite was the primary viscosifer for Fluids 1 and 3.

The components were added as described herein on the basis of percent by volume of the total drilling fluid composition. Fluids 1 and 3 are examples of conventional water-based drilling fluids, while Fluids 2 and 4 are examples of water-based drilling fluids containing zeolite according to the present embodiments. Fluids 2 and 4 are merely examples of the present embodiments. It is within the means of those of ordinary skill in the art to select different additives and different amounts than those listed in Table 1A.

TABLE 1A

| Component (Component Function) | Amt. of Component (% by volume) | | | |
|---|---|---|---|---|
| | Fluid 1 | Fluid 2 | Fluid 3 | Fluid 4 |
| Bentonite (viscosifier) | 1.96 | 0 | 0.98 | 0 |
| Barite (weighting agent) | 7.17 | 4.6 | 8.16 | 2.52 |
| Caustic soda (ion source for alkalinity) | 0.13 | 0 | 0.01 | 0 |
| Lime (ion source for alkalinity | 0.05 | 0.05 | 0 | 0 |
| CFR-3 (dispersant) | 0 | 0 | 0 | 0.08 |
| Biozan (fluid loss control) | 0 | 0 | 0.22 | 0.20 |
| CARBONOX (fluid loss control) | 0.13 | 0 | 0 | 0 |
| FWCA (fluid loss control) | 0 | 0.18 | 0 | 0 |
| Zeolite (Chabazite) (viscosifier) | 0 | 8.90 | 0 | 12.20 |
| Carrier fluid (water) | 90.56 | 86.27 | 90.63 | 84.99 |
| Density (lb/gal) | 10.55 | 10.47 | 10.68 | 10.23 |

Fluids 1-4 were tested to assess settling and to determine rheological data, from which yield point and plastic viscosity values could be calculated. The results are reported in Table 1B.

The rheological data, plastic viscosity and yield point for Fluids 1-4 were determined according to Section 2 of API Specification RP 13B, 12$^{th}$ Edition, 1988, of the American Petroleum Institute. Settling was determined by visual observation, after allowing the fluids to stand for about an hour.

TABLE 1B

| Fluid No. | Rheological Data (at Dial Readings) | | | | | | Plastic Viscosity (centepoise) | Yield Point (lb/100 ft$^2$) | Settling |
|---|---|---|---|---|---|---|---|---|---|
| | 600 rpm | 300 rpm | 200 rpm | 100 rpm | 6 rpm | 3 rpm | | | |
| 1 | 24 | 18 | 15 | 12 | 11 | 10.5 | 6 | 12 | None |
| 2 | 47 | 34 | 29 | 22 | 9 | 8 | 13 | 21 | None |
| 3 | 64 | 46 | 39 | 30 | 14 | 11 | 18 | 28 | None |
| 4 | 58 | 40 | 32.5 | 24.5 | 10 | 8.5 | 18 | 22 | None |

Those of ordinary skill in the art understand that the yield point of a drilling fluid is an important factor of the suitability of a drilling fluid for a particular drilling operation. In general, a yield point between about 5 and about 40 lb/100 ft$^2$ is desired for drilling vertical wells. As the amount of degrees from vertical of the well being drilled increases (as with angled and horizontal wells), the minimum desired yield point will also increase. Table 1B shows that fluids with zeolite (e.g., Fluids 2 and 4) attain favorable yield points as compared to fluids without zeolite (e.g., Fluids 1 and 3).

Gel strength, gel plateau, filter cake thickness and filtrate loss for Fluids 1-4 were determined, and the results are reported in Table 1C. The gel strength data was determined according to Section 2 of API Specification RP 13B, 12$^{th}$ Edition, 1988, of the American Petroleum Institute. The gel strength plateau is the difference between the gel strength at 10 seconds and the gel strength at 10 minutes. The filter cake thickness and filtrate loss values were determined according to Section 3 of API Specification RP 13B, 12$^{th}$ Edition, 1988, of the American Petroleum Institute.

TABLE 1C

| Fluid No. | Gel Strength at Time (lb/100 ft$^2$) | | Gel Strength Plateau | Filter Cake Thickness (inches) | Filtrate Loss (cc/30 min) |
|---|---|---|---|---|---|
| | 10 sec | 10 min | | | |
| 1 | 12 | 21 | 9 | 7/32" | 32 |
| 2 | 10 | 15 | 5 | 4/32" | 32 |
| 3 | 15 | 22 | 7 | 1/32" | 8.5 |
| 4 | 10 | 17 | 7 | 5/32" | 36 |

The gel strength, gel plateau, filter cake thickness and filtrate loss of a drilling fluid are relevant to the suitability of a drilling fluid for use in drilling operations. Generally, low gel strength plateau values (i.e., less difference between the gel strength at 10 seconds and the gel strength at 10 minutes) are desired. Table 1C shows that fluids with zeolite (e.g., Fluids 2 and 4) attain gel strengths and gel plateaus comparable to those of fluids without zeolite (e.g., Fluids 1 and 3).

With conventional drilling fluids, thinner filter cakes are generally desired because thinner filter cakes are easier to remove and less likely to cause interference with subsequent cementing operations. However, with zeolite-containing drilling fluids as described herein, the thickness of the filter cake is less of a factor because the zeolite in the filter cake can be made to set by contact with a compressive strength-developing amount of an alkalinity source, for example, a source of calcium ions, sodium ions or potassium ions.

Although the lime in Fluid 2 is an alkalinity source (calcium ions), the amount of lime used in Fluid 2 is not enough to cause the zeolite in Fluid 2 to develop compressive strength. If the zeolite develops compressive strength while drilling operations are still ongoing, the drilling fluid could become unpumpable. Thus, the amount of an alkalinity source, if any, included in the drilling fluid during drilling operations should be less than a compressive strength-developing amount with respect to the zeolite, which as illustrated below in Table 1D is greater than about 7 weight percent by weight of the zeolite.

TABLE 1D

| Fluid No. | Components | | | Compressive strength (psi) at 160° F. | | | |
|---|---|---|---|---|---|---|---|
| | Zeolite (wt %) | Lime (% bwoz) | Water (% bwoz) | 4 Hr | 8 Hr | 12 Hr | 24 Hr |
| 1 | 100 | 7 | 106 | 0 | 0 | 0 | 0 |
| 2 | 100 | 10 | 109 | 280 | 290 | 290 | 290 |
| 3 | 100 | 15 | 114 | 500 | 540 | 568 | 568 |
| 4 | 100 | 35 | 136 | 500 | 700 | 730 | 750 |

Fluid Nos. 1-4 reported in Table 1D above were prepared by combining zeolite, lime and water in the amounts reported in the table. Specifically, the zeolite and the lime were dry-mixed by hand in a glass jar. This dry mix was then added over a 15 second period to the water, which was stirring in a Waring blender at 4,000 RPM. The blender speed was then increased to 12,000 RPM and mixing was continued for 35 seconds. The amount of lime and water used to form each fluid is reported in the table as a "% bwoZ", which indicates a weight percent based on the weight of the zeolite. Chabazite, which is commercially available from C2C Zeolite Corporation of Calgary, Canada, was used as the zeolite for each fluid.

The compressive strength for each fluid was determined by Non-Destructive Sonic Testing as set forth in API Specification 10B 22nd Edition, 1997, of the American Petroleum Institute, the entire disclosure of which is incorporated herein by reference as if reproduced in its entirety. The compressive strength was measured at 160° F. at the reported elapsed times, and is reported in pounds per square inch (psi).

The compressive strength data reported in Table 1D indicates that a drilling fluid comprising zeolite would develop compressive strength when the amount of an alkalinity source, such as lime, is present in an amount greater than about 7% based on the weight of the zeolite. The identity of the zeolite and the carrier fluid comprising the drilling fluid may influence the amount of an alkalinity source necessary for the development of compressive strength. In addition, the identity of an alkalinity source may influence the amount necessary for the development of compressive strength. Thus, in some embodiments, a compressive strength-developing amount of an alkalinity source could be less than the 7% reported in Table 1D. Accordingly, the amount of an alkalinity source used in practicing the present embodiments need only be at least a compressive strength-developing amount. Those of ordinary skill in the art can determine through the exercise of routine experimentation the amount of an alkalinity source sufficient for the development of compressive strength with zeolite-containing drilling fluids.

The data reported in Table 1D is illustrative of the expected reaction when a drilling fluid that includes zeolite comes into contact with more than about 7 weight percent of an alkalinity source, such as lime. Thus, portions of a drilling fluid comprising zeolite that remain in the wellbore, such as in filter cake on a wall of a wellbore, can be caused to set by subsequent contact with a compressive-strength developing amount of an alkalinity source.

In certain embodiments, cementitious material as described herein acts as an alkalinity source with respect to the zeolite because the cementitious material is a source of calcium ions, sodium ions or potassium ions. Thus, by mixing a zeolite-containing drilling fluid with cementitious material, a cementing composition suitable for introducing into a wellbore is formed, which cementing composition has the additional benefit that the zeolite will set, and therefore will not interfere with the bonding of the cementing composition to the walls of the casing or the wellbore.

EXAMPLE 2

Example 2 illustrates cementing compositions that were prepared by mixing the drilling fluids illustrated in Example 1 (Nos. 1-4) with cementitious material (API Class H cement obtained from LaFarge Corp). Six cementing compositions (Comp. Nos. 1-6) were prepared by combining the components as set forth in Table 2A below Cementing Comp. Nos. 1-6 were prepared by adding the reported amount of cementitious material to the reported amount of drilling fluid being stirred in a Waring blender at 4000 rpm at room temperature. The cementitious material was added to the drilling fluid over a 15 second period. When all of the cementitious material was added to the drilling fluid, a cover was placed on the blender and mixing was continued at about 12,000 RPM for 35 seconds.

Cementing Comp. Nos. 1-6 were tested to determine rheological data, from which yield point and plastic viscosity values were calculated. The results are reported in Table 2B.

The rheological data, plastic viscosity (centepoise), and yield point (lb/100 ft$^2$) for Cementing Comp. Nos. 1-6 was determined according to Section 2 of API Specification 10B, $22^{nd}$ Edition, 1997, of the American Petroleum Institute.

TABLE 2B

| Comp. No. | Rheological Data (Centepoise, at Dial Reading) | | | | | | Plastic Viscosity (centepoise) | Yield Point (lb/100 ft$^2$) |
| --- | --- | --- | --- | --- | --- | --- | --- | --- |
| | 600 rpm | 300 rpm | 200 rpm | 100 rpm | 6 rpm | 3 rpm | | |
| 1 | 130 | 122 | 118 | 112 | 59 | 44 | 15 | 114 |
| 2 | 75 | 51 | 40 | 36 | 16 | 14 | 23 | 30 |
| 3 | 74 | 65 | 62 | 58 | 51 | 22 | 11 | 58 |
| 4 | 61 | 44 | 36 | 28 | 9 | 7 | 24 | 21 |
| 5 | 79 | 51 | 41 | 30 | 18 | 17 | 32 | 33 |
| 6 | 96 | 42 | 38 | 55 | 27 | 20 | 11 | 34 |

Table 2B shows that cementing compositions made with drilling fluids containing zeolite (e.g., Cementing Comp. Nos. 2 and 4-6) have rheological properties that are within acceptable parameters for use as cementing compositions. In particular, values recorded at the lower range of the dial readings (e.g., 6 rpm and 3 rpm) are illustrative of the rheology of a fluid that has little or no motion. Thus, the value at a low dial reading (e.g., 6 rpm and 3 rpm) is indicative of the amount of force required to put the liquid in motion. The higher the value, the more force is required to move the fluid. If too much force is required to move a fluid, than the fluid is considered unpumpable.

The 6 rpm and 3 rpm dial readings of Cementing Comp. Nos. 2 and 4-6 indicate that the compositions are pumpable. In contrast, compositions made with drilling fluids that do not contain zeolite (e.g., Cementing Comp. Nos. 1 and 3) do not maintain sufficient rheological properties for use as cementing compositions. In particular, the 6 rpm and 3 rpm dial readings of Cementing Comp. Nos. 1 and 3 indicate that the compositions are becoming unpumpable, which is expected because of the known incompatability between bentonite and

TABLE 2A

| Components | Cementing Comp. Nos. | | | | | |
| --- | --- | --- | --- | --- | --- | --- |
| | 1 | 2 | 3 | 4 | 5 | 6 |
| Drilling fluid type | No. 1 | No. 2 (8.90% by volume zeolite) | No. 3 | No. 4 (12.20% by volume zeolite) | No. 2 (8.90% by volume zeolite) | No. 4 (12.20% by volume zeolite) |
| Drilling fluid amt. (mL) | 350 | 350 | 350 | 350 | 350 | 350 |
| Cement. (grams) | 175 | 96.2 | 175 | 65.5 | 175 | 175 | cementitious material, which incompatibility becomes apparent even with a relatively small amount of bentonite, for example, less than 2% by volume.

To further illustrate the suitability of cementing compositions made with drilling fluids containing zeolite, the compressive strengths of each of Cementing Comp. Nos. 1-6 were determined. The results are reported in Table 2C.

The compressive strength for each composition was determined by Non-Destructive Sonic Testing as set forth in API Specification 10B 22nd Edition, 1997, of the American Petroleum Institute. The compressive strength was measured at 190° F. at the reported elapsed times, and is reported in Table 2C in pounds per square inch (psi).

TABLE 2C

| Cement. Comp. No. | Compressive strength (psi) at 190° F. | | | |
| --- | --- | --- | --- | --- |
| | 4 Hours | 8 Hours | 12 Hours | 24 Hours |
| 1 | 120 | 150 | 189 | 190 |
| 2 | 170 | 300 | 343 | 416 |
| 3 | 110 | 140 | 160 | 169 |
| 4 | 140 | 170 | 202 | 244 |
| 5 | 420 | 550 | 583 | 625 |
| 6 | 750 | 930 | 1018 | 1082 |

The compressive strength data for the compositions in Table 2C indicates that cementing compositions made with a drilling fluid containing zeolite (e.g., Cementing Comp. Nos. 2 and 4-6) develop compressive strengths suitable for use in cementing and sealing an area. In contrast, cementing compositions made with conventional drilling fluids (e.g., Cementing Comp. Nos. 1 and 3), do not develop sufficient compressive strength for use in cementing and sealing an area.

Of the cementing compositions made with zeolite-containing drilling fluid, (Cementing Comp. Nos. 2 and 4-6), Cementing Comp. No. 6 contained the most cementitious material (175 g), the most zeolite (12.2% by volume of the drilling fluid), and achieved the highest compressive strength. Cementing Comp. No. 4 contained the least amount of cementitious material (65.5 g), the most amount of zeolite (12.2% by volume of the drilling fluid), and achieved the lowest compressive strength, although such compressive strength was still greater than that of Cementing Comp. Nos. 1 and 3.

The cementitious material also acts as an activator with respect to the zeolite in the drilling fluid. The amount of cementitious material used to prepare Cementing Comp. Nos. 2 and 4-6 is about 122, 60, 222 and 160 weight percent of the weight of the zeolite respectively, and is therefore a compressive-strength developing amount with respect to the zeolite in the drilling fluid. Thus, Cementing Comp. Nos. 2 and 4-6 are suitable for introducing into a wellbore and also provide the additional benefit that the zeolite will set, and therefore will not interfere with the bonding of the cementing composition to the walls of the casing or the wellbore.

The methods and compositions described herein also demonstrate an improvement over conventional drilling and cementing operations because according to the present embodiments, the drilling fluid can be incorporated into a cementing composition. Incorporating the drilling fluid used to form a wellbore into a cementing composition used to cement in the wellbore reduces the need to dispose of used drilling fluid, and reduces the need to use flushes, spacers or other fluids to remove drilling fluid, filter cake etc., thereby reducing drilling fluid displacement problems and drilling fluid/cement incompatibilities.

Other embodiments of the current invention will be apparent to those skilled in the art from a consideration of this specification or practice of the invention disclosed herein. However, the foregoing specification is considered merely exemplary of the current invention with the true scope and spirit of the invention being indicated by the following claims.

The invention claimed is:

1. A method of performing cementing operations in a wellbore comprising:
   drilling a wellbore extending from a surface of the earth into a subterranean formation;
   continuously circulating in the wellbore during the drilling of the wellbore, a drilling fluid comprising zeolite and a carrier fluid, wherein the zeolite comprises chabazite;
   mixing a cementitious material with an amount of the drilling fluid to form a cementing composition;
   introducing the cementing composition into the wellbore; and
   allowing the cementing composition to set therein.

2. The method of claim 1 wherein the mixing of the cementitious material with the amount of the drilling fluid occurs upon the happening of a predefined condition.

3. The method of claim 2 wherein the predefined condition is selected from the group consisting of drilling the wellbore to a desired depth and circulating a predefined amount of the drilling fluid out of the wellbore to the surface.

4. The method of claim 1 wherein the drilling fluid comprises zeolite in an amount selected from the group consisting of from about 1% to about 25% by volume, from about 5% to about 20% by volume, and from about 8% to about 15% by volume.

5. The method of claim 1 wherein the cementing composition further comprises at least one additive selected from the group consisting of activators, weighting agents, density modifying materials, dispersing agents, set retarding agents, set accelerating agents, fluid loss control agents, strength retrogression control agents, loss circulation material, surfactants, defoamers and compatible viscosifying agents.

6. The method of claim 5 wherein the additive comprises at least one activator selected from the group consisting of calcium hydroxide, calcium oxide, calcium nitrate, sodium silicate, sodium fluoride, sodium silicofluoride, sodium carbonate, potassium carbonate, sodium hydroxide, potassium hydroxide, sodium sulfate and mixtures thereof.

7. The method of claim 5 wherein the additive comprises at least one set accelerating agent selected from the group consisting of sodium chloride, sodium sulfate, sodium aluminate, sodium carbonate, calcium chloride, calcium sulfate, calcium carbonate, aluminum sulfate, potassium aluminum sulfate, sodium aluminum sulfate, potassium sulfate and potassium carbonate.

8. The method of claim 5 wherein the additive comprises at least one compatible viscosifier selected from the group consisting of polymeric additives and modified cellulose and derivatives thereof.

9. The method of claim 5 wherein the additive comprises a fluid loss control agent comprising cellulose.

10. The method of claim 5 wherein the additive comprises at least one dispersant selected from the group consisting of sulfonated styrene maleic anhydride copolymer, sulfonated vinyltoluene maleic anhydride copolymer, sodium naphthalene sulfonate condensed with formaldehyde, sulfonated acetone condensed with formaldehyde, lignosulfonates and interpolymers of acrylic acid, allyloxybenzene sulfonate, allyl sulfonate and non-ionic monomers.

11. The method of claim 5 wherein the additive comprises at least one weighting agent selected from the group consisting of barite, hematite, manganese tetraoxide, ilmenite, calcium carbonate and galena.

12. The method of claim 1 wherein the carrier fluid is selected from the group consisting of water, water-based gels, emulsions, acids, or mixtures thereof.

13. The method of claim 1 wherein the carrier fluid comprises water selected from the group consisting of fresh water, unsaturated salt solution, brine, seawater, and saturated salt solution.

14. The method of claim 1 wherein the drilling fluid comprises carrier fluid in an amount selected from the group consisting of from about 3% to about 98% by volume, from about 50% to about 92% by volume and from about 80% to about 90% by volume.

15. The method of claim 1 wherein the cementitious material comprises at least one of Portland cement, pozzolan cement, gypsum cement, aluminous cement, silica cement, and alkaline cement.

16. The method of claim 1 wherein the cementing composition comprises at least about 20% by weight cementitious material.

17. The method of claim 1 wherein the cementing composition comprises at least a compressive-strength development amount of the cementitious material with respect to the zeolite in the drilling fluid.

* * * * *